(12) United States Patent
Zhou et al.

(10) Patent No.: US 8,991,432 B2
(45) Date of Patent: Mar. 31, 2015

(54) TOUCH SWITCH SHOWER

(75) Inventors: Huasong Zhou, Xiamen (CN);
Guoqiang Lu, Xiamen (CN); Xiaozhao Sun, Fujian (CN); Xianguo Zou, Xiamen (CN)

(73) Assignees: Xiamen Solex High-Tech Industries Co., Ltd., Xiamen (CN); Huasong Zhou, Xiamen (CN)

( * ) Notice: Subject to any disclaimer, the term of this patent is extended or adjusted under 35 U.S.C. 154(b) by 105 days.

(21) Appl. No.: 13/823,660

(22) PCT Filed: Sep. 14, 2011

(86) PCT No.: PCT/CN2011/079601
§ 371 (c)(1),
(2), (4) Date: Mar. 14, 2013

(87) PCT Pub. No.: WO2012/034512
PCT Pub. Date: Mar. 22, 2012

(65) Prior Publication Data
US 2013/0168583 A1 Jul. 4, 2013

(30) Foreign Application Priority Data
Sep. 16, 2010 (CN) .................. 2010 2 0533165 U

(51) Int. Cl.
| F16K 31/06 | (2006.01) |
| E03C 1/05 | (2006.01) |
| B05B 1/18 | (2006.01) |
| B05B 12/00 | (2006.01) |
| B05B 1/16 | (2006.01) |

(52) U.S. Cl.
CPC .............. *F16K 31/0675* (2013.01); *B05B 1/18* (2013.01); *B05B 12/002* (2013.01); *B05B 12/004* (2013.01); *B05B 1/1627* (2013.01); *B05B 1/1636* (2013.01)
USPC .................. 137/883; 239/444; 251/129.04

(58) Field of Classification Search
USPC ................. 251/129.04; 239/444, 560, 583, 239/DIG. 19; 137/883
See application file for complete search history.

(56) References Cited

U.S. PATENT DOCUMENTS

| 8,118,240 B2* | 2/2012 | Rodenbeck et al. ............ 239/67 |
| 8,132,778 B2* | 3/2012 | Connors ................... 251/129.04 |
| 8,243,040 B2* | 8/2012 | Koottungal ................... 345/173 |

(Continued)

FOREIGN PATENT DOCUMENTS

| CN | 201264006 Y | 7/2009 |
| CN | 201316206 Y | 9/2009 |
| CN | 101733208 A | 6/2010 |

(Continued)

*Primary Examiner* — John Fox
(74) *Attorney, Agent, or Firm* — Rabin & Berdo, P.C.

(57) ABSTRACT

A touch switch shower includes a shower body and a switch control device. The shower body is disposed with a root waterway, several diversion waterways and an outlet cover unit, each diversion waterway is disposed with an electromagnetic valve to control the on-off thereof. The front side of the outlet cover unit is divided into several touch areas with the same number of electromagnetic valves. The switch control device is disposed at least a processing unit, several touch modules with same number with the electromagnetic valves and a power device connected to the processing unit, the touch layer of the touch module is separately disposed in the corresponding touch area of the outlet cover unit, the processing unit is connected to the touch module in signal way, the processing unit is connected to the electromagnetic valve in signal way. The touch layer is separately disposed in the touch area.

11 Claims, 15 Drawing Sheets

(56) References Cited

U.S. PATENT DOCUMENTS 8,297,538 B2 * 10/2012 Zhou .......................... 239/445
2009/0314358 A1 12/2009 Stimpson et al.

FOREIGN PATENT DOCUMENTS

| CN | 201572692 U | 9/2010 |
|---|---|---|
| CN | 201815400 U | 5/2011 |

* cited by examiner

TOUCH SWITCH SHOWER

FIELD OF THE INVENTION

The present invention relates to a shower, especially to a touch switch shower.

BACKGROUND OF THE INVENTION

The traditional shower is usually applied with a switch by hand, such as rotating switch or sliding switch. As it needs large force to switch by hand, people has to judge the switch angle. So the switch is inconvenient. To solve the problem, a touch switch shower is provided, for example, a patent applied by the same applicant named a shower applied with electrical touch to control the switch of the waterway with publication number CN101733208A. it is disposed with a shower body and a control unit. The shower body includes a root waterway and at least two diversion waterways, each diversion waterway is connected to the root waterway by an electromagnetic valve. the control unit includes a circuit board and a touch panel, the touch panel is fixed to the shower body, the circuit board is connected to the touch panel to receive the touch signal and then calculate the control signal according to the touch signal, the circuit board is connected to the electromagnetic valve in signal way and is controlled the on-off of the electromagnet valve by controlling the signal. As it needs the touch panel, to ensure the size of the shower, the touch panel is small. So it is inconvenient for user to touch and operate.

SUMMARY OF THE INVENTION

The present invention is provided with a touch switch shower, which overcomes the disadvantages of the existing shower of inconvenient operation.

One technical proposal of the present invention to solve the technical problem is as below:

A touch switch shower, which is disposed with a shower body and a switch control device; the shower body is disposed with a root waterway, several diversion waterways and an outlet cover unit, each diversion waterway is disposed with an electromagnetic valve to control the on-off thereof;

The front side of the outlet cover unit is divided into several touch areas with same number with the electromagnetic valves;

The switch control device is disposed at least a processing unit, several touch modules with same number with the electromagnetic valves and a power device connected to the processing unit, the touch layers of the touch modules are separately disposed in the corresponding touch areas of the outlet cover unit, the processing unit is connected to the touch modules in signal way, the processing unit is connected to the electromagnetic valves in signal way.

In another preferred embodiment, the outlet cover unit includes several outlet covers with same number with the diversion waterways and corresponding to the diversion waterways one by one, the front sides of the outlet covers form the touch areas, the several outlet covers form different outlet areas.

In another preferred embodiment, the power device includes a power generating module.

In another preferred embodiment, the power device includes a power generating module and a battery module electrically connected to the power generating module, the battery module is electrically connected to the processing unit.

In another preferred embodiment, the power device is disposed with a lead electrically connected to the processing unit and a plug connected to the lead, the plug can connect to an outer power resource.

In another preferred embodiment, the power module includes an impeller rotated and disposed inside the root waterway and a generator fixed to the shower body, the impeller is rotated relatively to the generator under the force of the flow inside the root waterway.

In another preferred embodiment, a rectifier and filter circuit and a voltage reduction and stabilizing circuit are electrically connected between the output of the generator and the battery module.

In another preferred embodiment, the back side of each outlet cover is convex and disposed with a connection cylinder, the connection cylinder is coated with a signal connection layer;

The touch module is further disposed with a touch processing circuit, the signal connection layer is connected to the touch layer and the touch processing circuit in signal way.

In another preferred embodiment, the shower body is further disposed with a valve seat; the outlet cover unit includes three outlet covers of concentrically arranged, the edge of the back side of each outlet cover is disposed with a limited cylinder of which the axial is parallel to the axis of the concentric circle, the limited cylinder is fixed to the valve seat and is passing through the valve seat.

In another preferred embodiment, the generator is disposed with a detecting module to detect the state of the root waterway, the detecting module is connected to the processing unit in signal way.

Another technical proposal of the present invention is as below:

A touch switch shower, which includes a shower body and a switch control device; the shower body is disposed with a root waterway, several diversion waterways and an outlet cover unit; a rotation water diversion body is rotated and disposed inside the shower body, the rotation water diversion body is disposed with a through hole, one end of the through hole is connected to the root waterway, while the other end of the through hole is corresponding to one of the diversion waterway;

The front end of the outlet cover unit is divided into several touch areas with same number with the diversion waterway;

The switch control device is disposed at least a processing unit, touch modules with same number with the diversion waterways, a power device connected to the processing unit and a motor, the touch layers of the touch modules are separately disposed in the corresponding touch areas of the outlet cover unit, the processing unit is connected to the touch modules in signal way, the processing unit is connected to the motor in signal way, the motor is connected to the water diversion body.

Compared to the existing technology, the technical proposal of the present invention has advantages as below:
1. The touch layer of the touch modules is separately disposed in the touch area of the outlet cover unit, the touch area is large enough for the user to operate. The operation is convenient and accurate with low cost, and the size of the shower is reduced. Several touch layers are corresponding to the electromagnetic valves one by one, which is convenient to control. And the outlet type is with multi-combination.
2. The several outlet covers forms different outlets, the front sides of the outlet covers forms the touch areas, each touch layer is clearly disposed, the outlet cover is corresponding to the diversion waterway one by one for the user to control accurately and conveniently.

3. The power device includes a power generating module and a battery module, the battery module is electrically connected to the processing unit, to ensure that it still works in lower water pressure.

4. A rectifier and filter circuit and a voltage reducing and stabilizing circuit are disposed between the output of the power generating and the battery module, to ensure the stabilized DC.

5. The back side of each outlet cover is convex and disposed with a connection cylinder, which is coated with a signal connection layer, the connection cylinder is applied with limited effect and signal connected effect.

6. The processing unit is further connected with an LED indicating light in signal way for user to see the working state of the processing unit or the electromagnetic valve.

7. When user touches different touch layer, the motor rotates in different angle to rotate the water diversion body to rotate relatively to the shower body in different angle, making different diversion waterways switched to connect to the root waterway, the switch is fast and convenient with small size.

BRIEF DESCRIPTION OF THE DRAWINGS

The first embodiment of the present invention will be further described with the drawings and the embodiments.

DETAILED DESCRIPTION OF THE DRAWINGS

The First Embodiment

Figure 1:
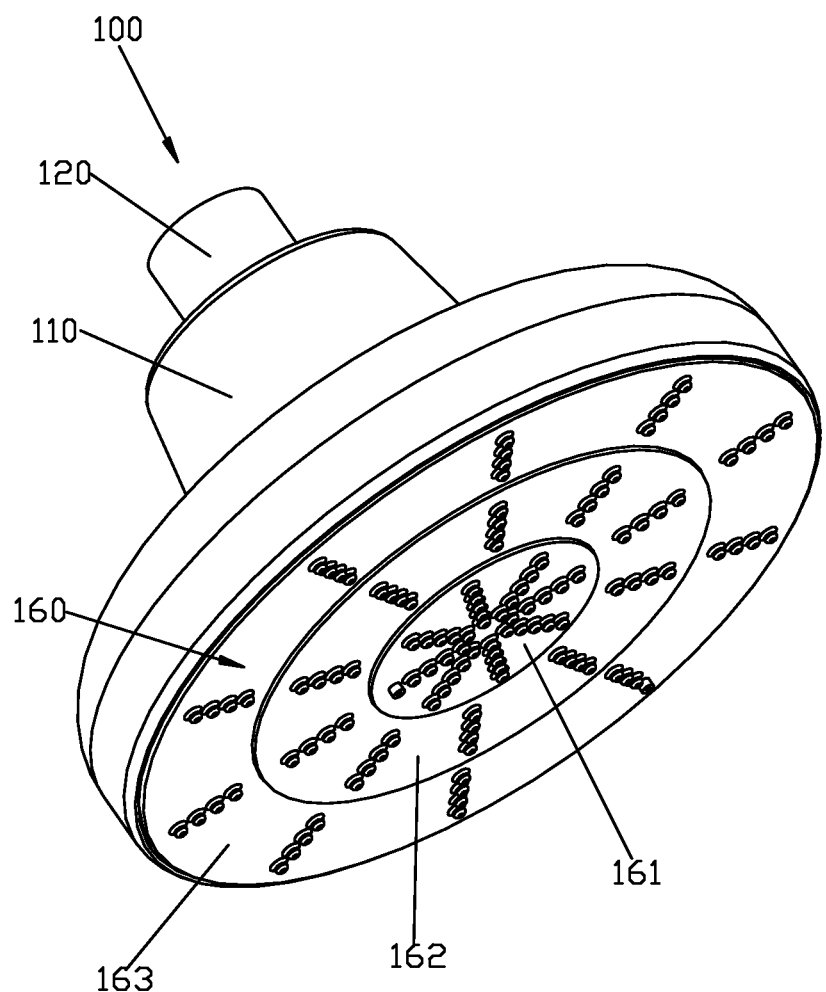
FIG. 1 illustrates the structure of the shower of the first embodiment of the present invention.
Figure 2:
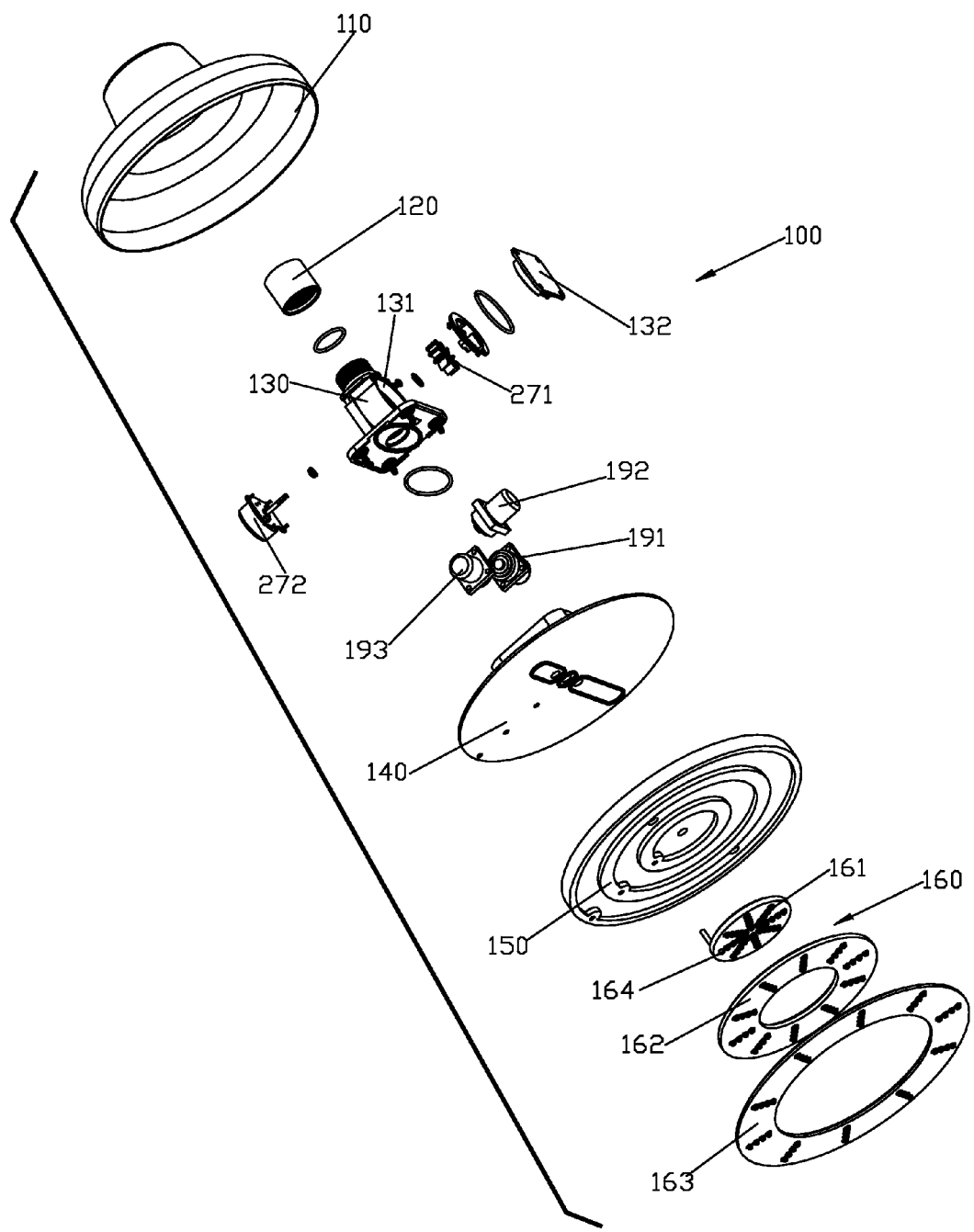
FIG. 2 illustrates the breakdown structure of the shower of the first embodiment of the present invention in one view.
Figure 3:
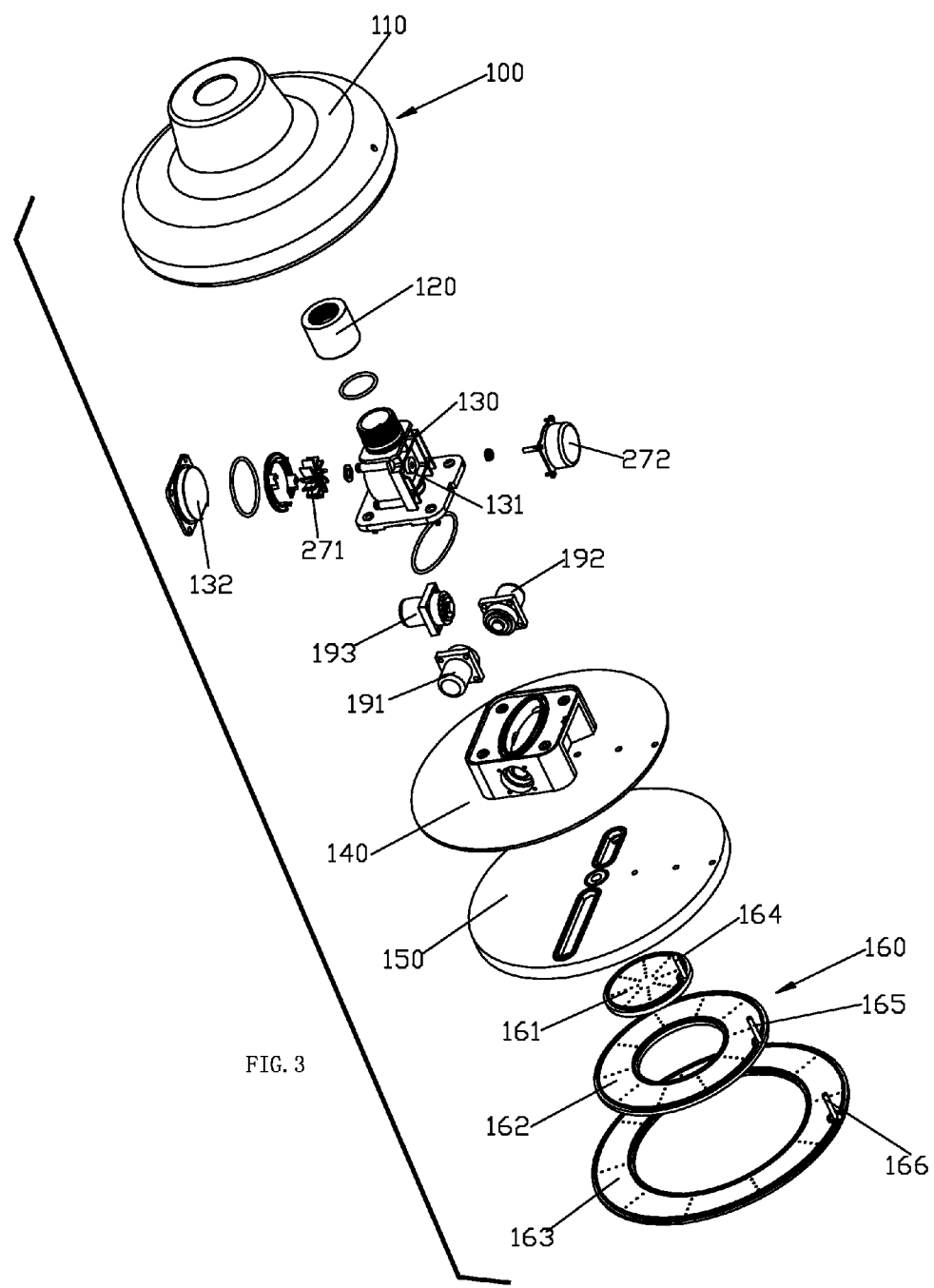
FIG. 3 illustrates the breakdown structure of the shower of the first embodiment of the present invention in another view.
Figure 4:
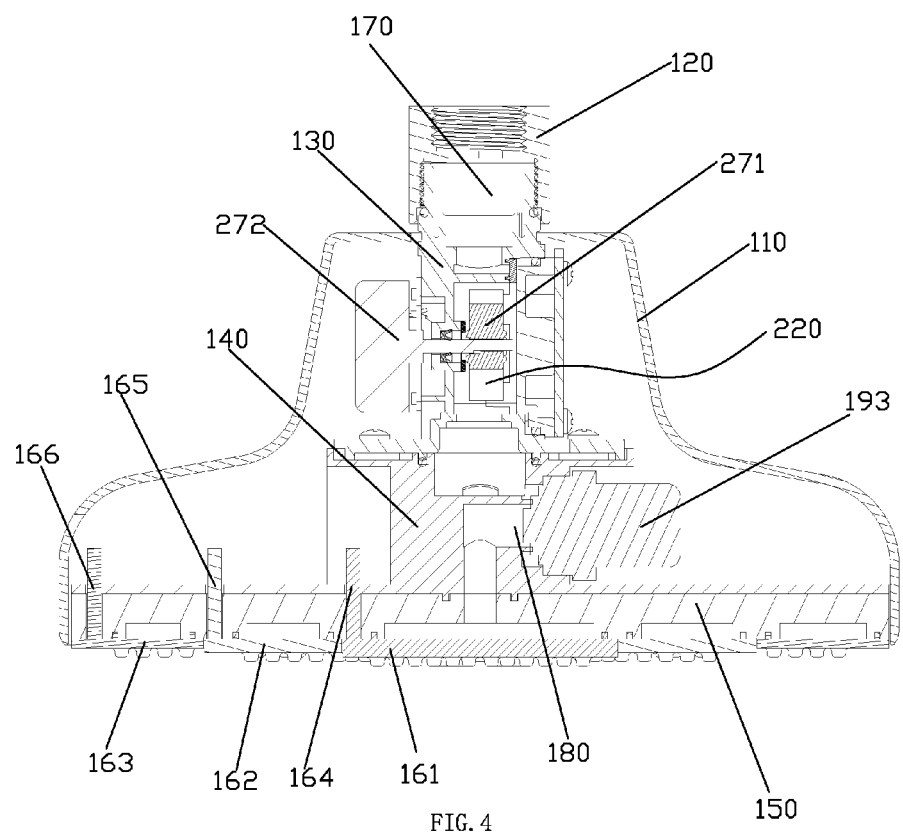
FIG. 4 illustrates one sectional view of the shower of the first embodiment of the present invention.
Figure 5:
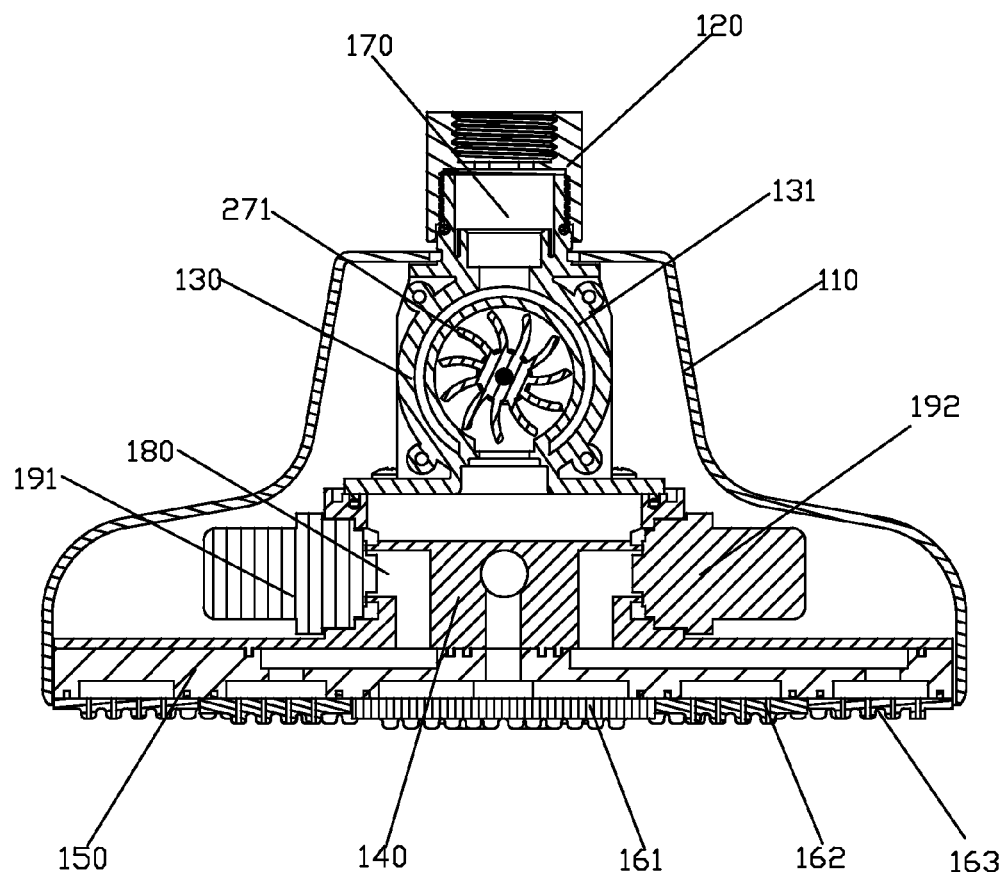
FIG. 5 illustrates another sectional view of the shower of the first embodiment of the present invention.
Figure 6:
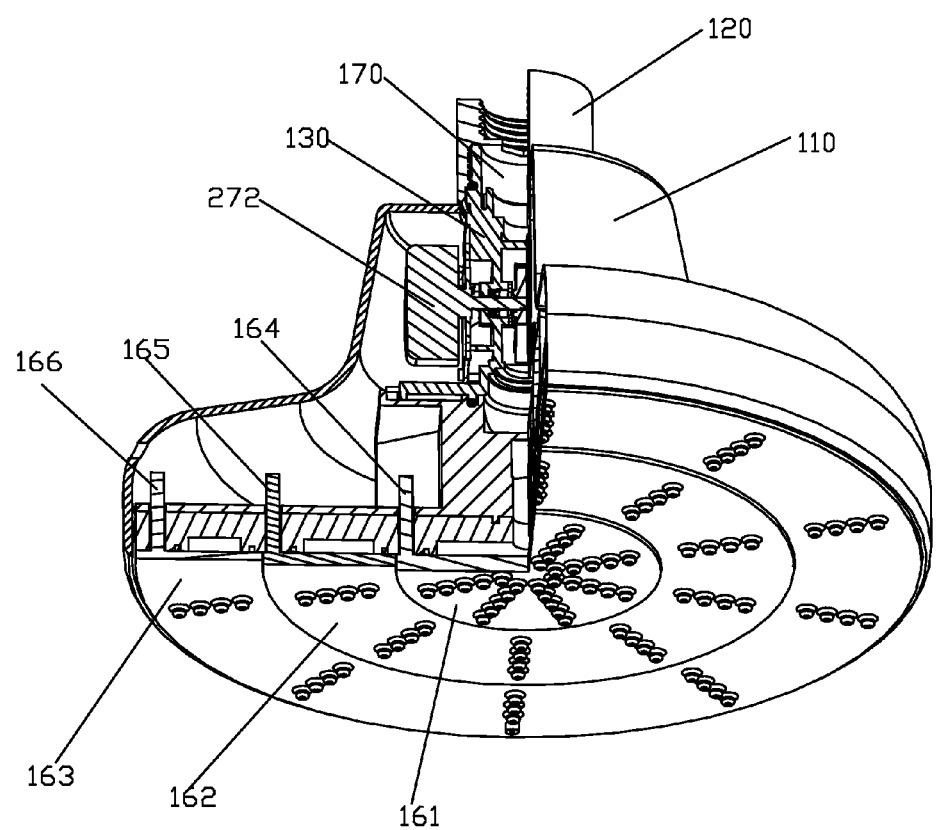
FIG. 6 illustrates partial sectional view of the shower of the first embodiment of the present invention.
Figure 7:
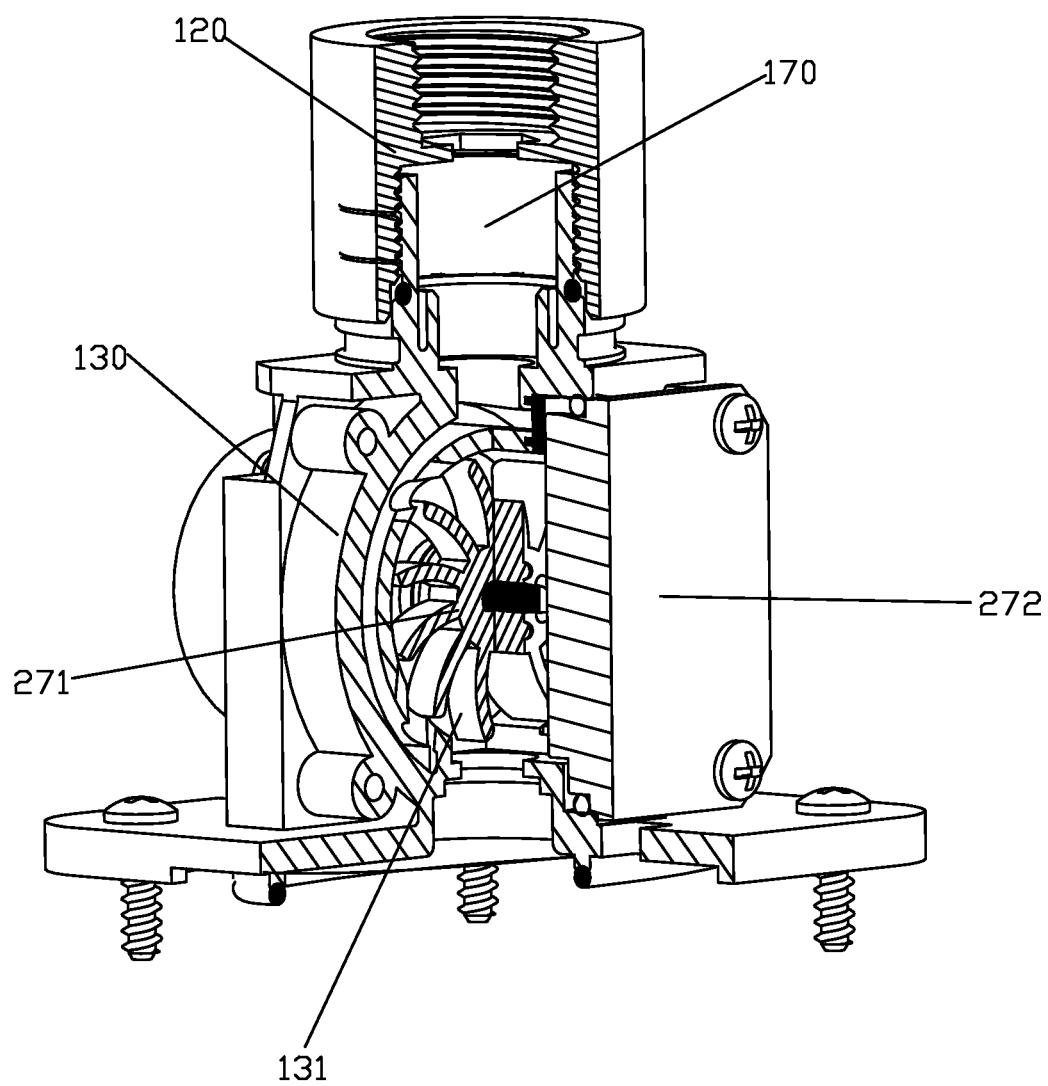
FIG. 7 illustrates the power device of the shower of the first embodiment of the present invention.

Please refer to the FIG. 1 to the FIG. 7. A touch switch shower includes a shower body 100 and a switch control device 200.

The shower body 100 includes a housing 110, a joint 120, a fixation seat 130, a valve seat 140, a water diversion body 150 and an outlet cover unit 160. The housing 110 is horn shaped. The fixation seat 130 is concaved and disposed with an assembly groove 131, an impeller cover 132 is further disposed to cover the opening of the assembly groove 131. The upper part of the fixation seat 130 is extended out of the housing 110 from down to up. The joint 120 is fixed to the extended part of fixation seat 130 extended out of the housing 110, to make: the housing 110, the joint 120 and the fixation seat 130 to be fixed together; the shower body 100 disposed with a root waterway 170 to connect to the water resource. The assembly groove 131 of the fixation seat 130 is one part of the root waterway 170.

The valve seat 140 is fixed to the lower part of the fixation seat 130, the outer revolution surface of the valve seat 140 is fixed to the lower end of the inside revolution surface of the housing 110. The water diversion body 150 is fixed to the lower of the valve seat 140, the outlet cover unit 160 is fixed to the lower of the valve seat 140, to make three outlet cavities of concentrically arranged formed between the water diversion body 150 and the outlet cover unit 160; the valve seat 140 is disposed with three diversion waterways 180 separately connected to the three outlet cavities, an electromagnetic valve 191, 192, 193 is separately disposed between each diversion waterway 180 and the root waterway 170, the on-off of the each diversion waterway 180 is separately controlled by the electromagnetic valve 191, 192, 193 to make the outlet cavity to connect to the root waterway 170. the outlet cover unit 160 is disposed with three outlet covers 161, 162, 163 of concentrically arranged, the three outlet covers 161, 162, 163 are corresponding to the three outlet cavities one by one, to make water of the three outlet cavities to flow out of the three outlet covers 161, 162, 163. The edge of the back side of each outlet cover 161, 162, 163 is disposed with a limited cylinder 164, 165, 166 with the axis parallel to the axis of the concentric circle, the limited cylinders 164, 165, 166 are fixed to the valve seat 140 and are running through the valve seat 140.

Figure 8:
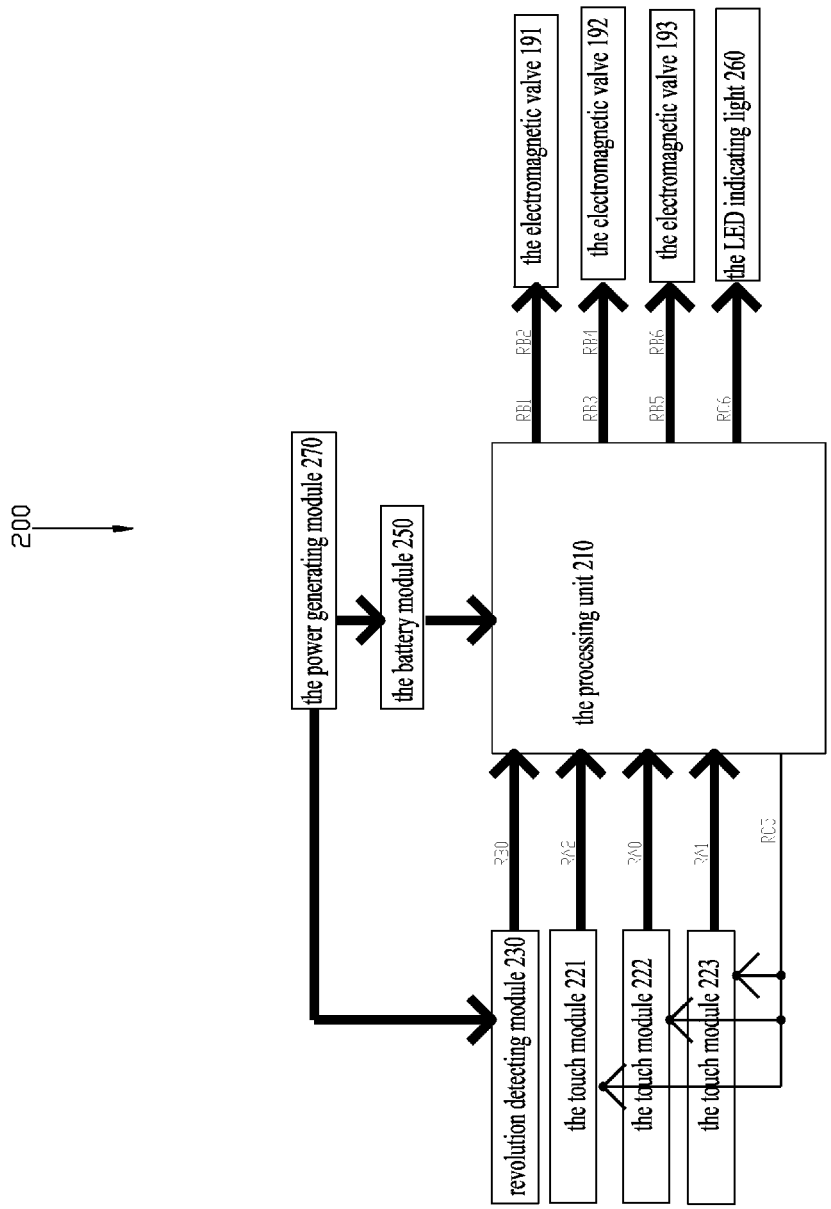
FIG. 8 illustrates the control principle of the shower of the first embodiment of the present invention.

Please refer to the FIG. 8, the switch control device 200 is disposed with a processing unit 210, three touch modules 221, 222, 223, a power device 220, three driving modules 191, 192, 193 and a revolution detecting module 230.

Figure 9:
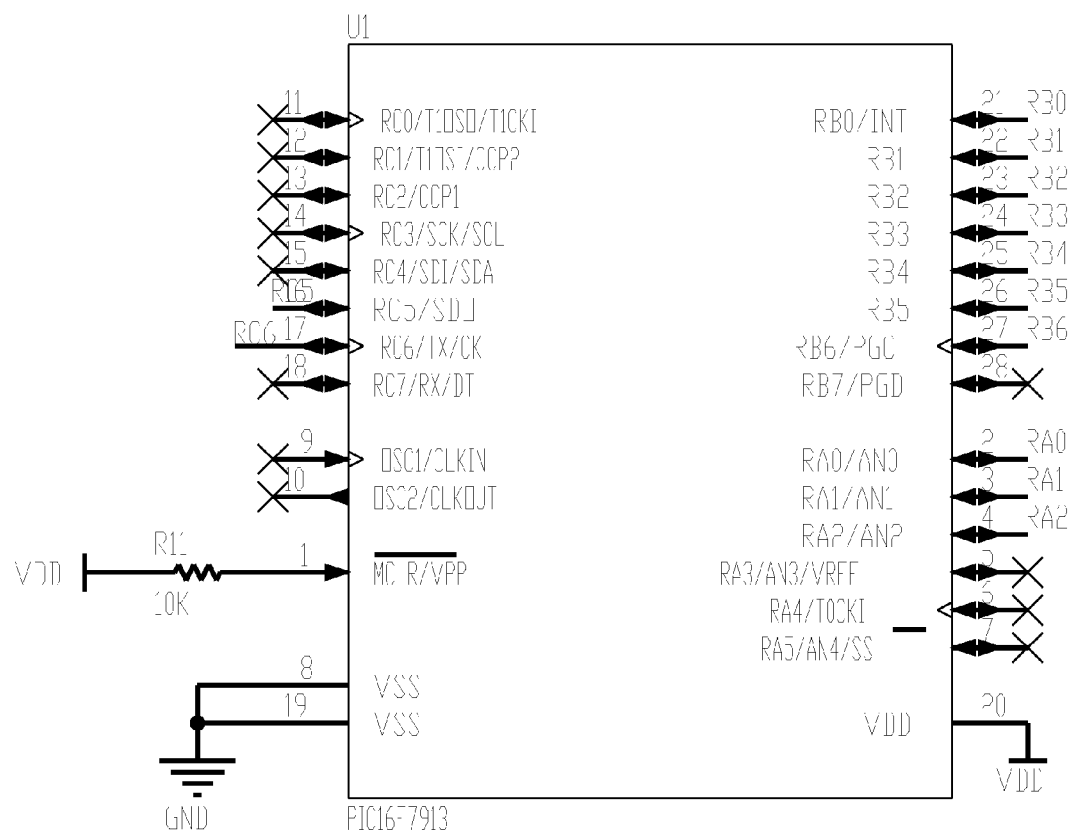
FIG. 9 illustrates the processing unit of the first embodiment of the present invention.

The processing unit 210 is applied with the microcontroller PIC16F913, as figured in the FIG. 9.

Figure 10:
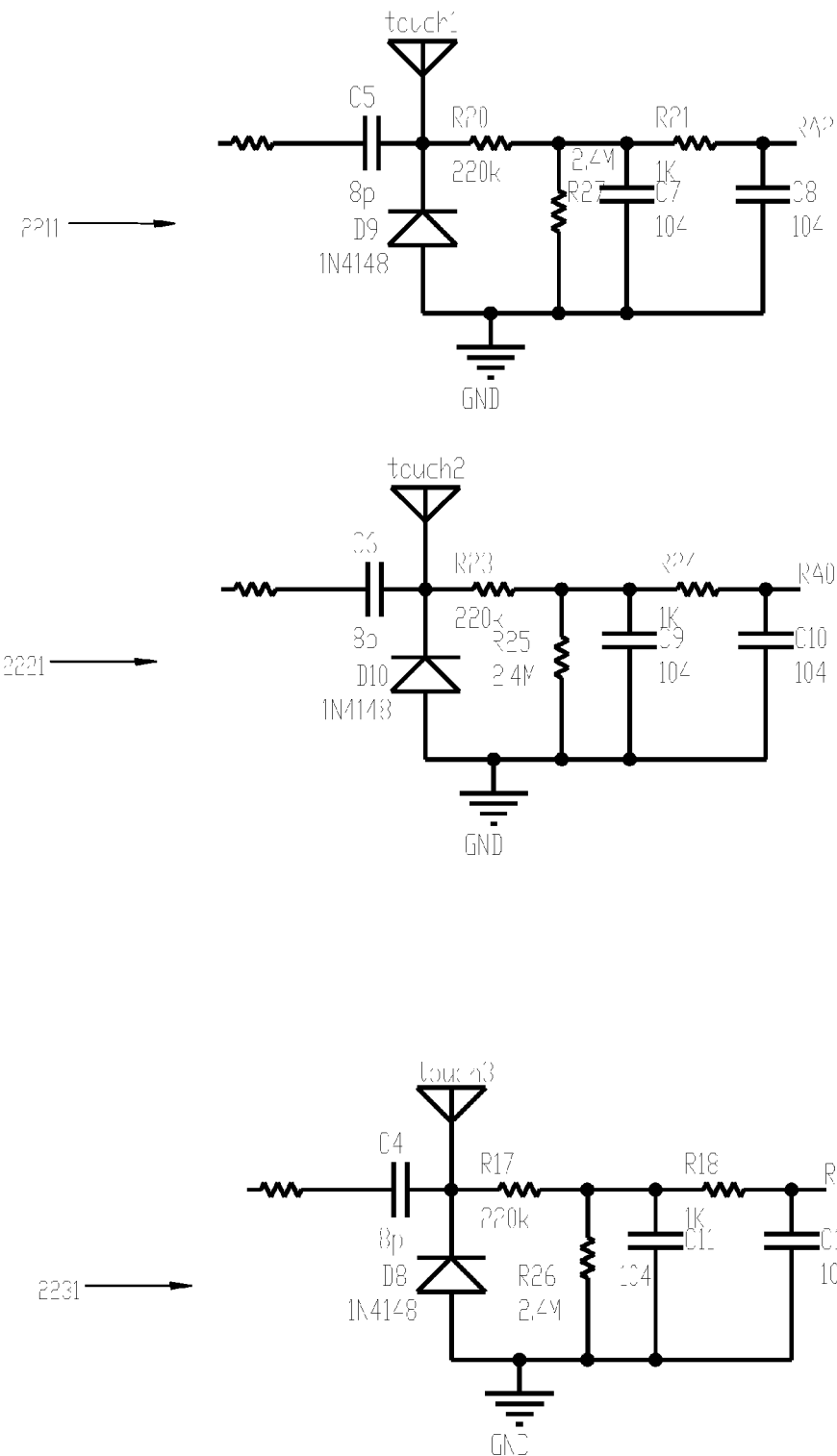
FIG. 10 illustrates the diagram of the touch processing circuit of the first embodiment of the present invention.

Each touch module 221, 222, 223 is separately disposed with a touch processing circuit 2211, 2221, 2231 and a touch layer, the diagram of the touch processing circuit is figured in the FIG. 10. the touch layer of the three touch module 221, 222, 223 is separately electroplated to the front side of the outlet cover 161, 162, 163 to form three touch areas, so that touch operation is realized when the user touched different touch area. The limited cylinder 164, 165, 166 is coated with signal connection layer, which is connected to the touch processing circuit and the touch layer in signal way. One end of the three touch processing circuits is separately connected to the pin RC5 of the processing unit 210 in signal way, while the other end is separately connected to the pin RA2, RA0, RA1 of the processing unit 210 in signal way; thereinto: the pin RC5 of the processing unit 210 is provided pulsing signal of 200 KHz to the touch processing circuit 2211, 2221, 2231, when touched, the pulsing signal is bypassed by the body capacitance and then the level of the output of the touch module changes, the processing unit detects the change of the level to catch the touch signal.

Figure 11:
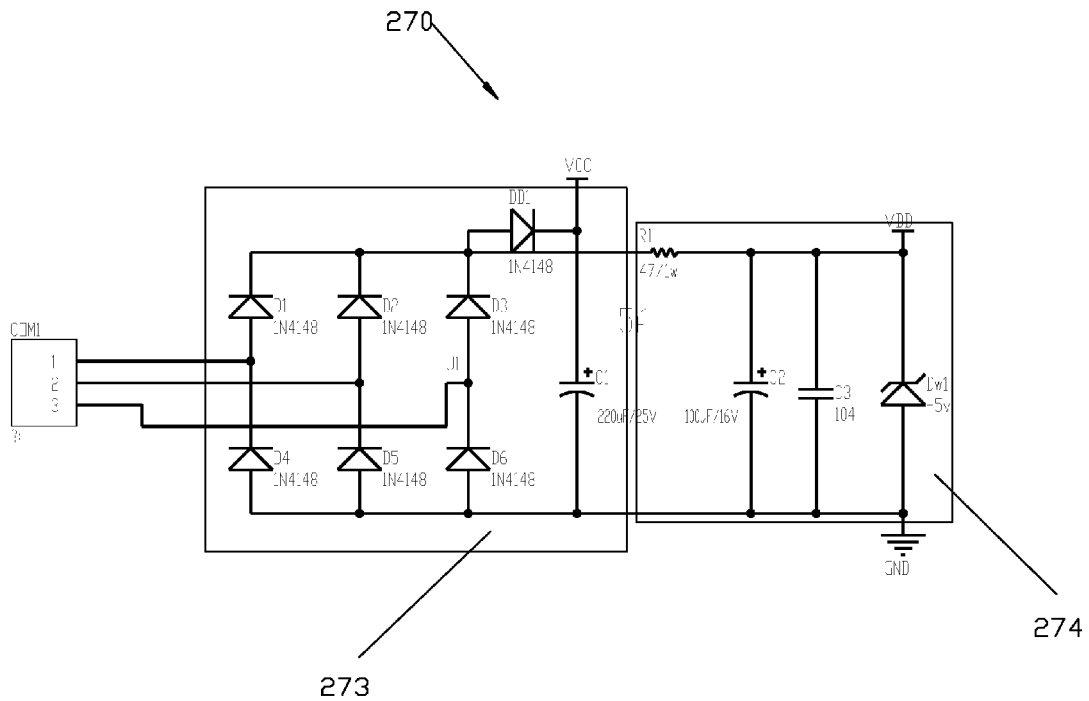
FIG. 11 illustrates the diagram of the rectifier and filter circuit and the voltage reduction and stabilizing circuit of the first embodiment of the present invention.
Figure 11:
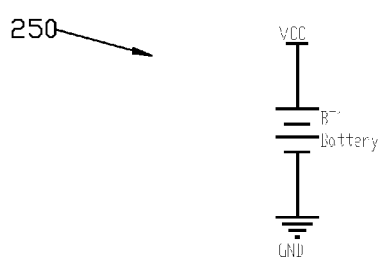

The power device 220 includes a power generating module 270 and a battery module 250 electrically connected to the power generating module 270, the battery module 250 is electrically connected to the processing unit 210 to supply power to the processing unit 210. the power generating module 270 is disposed with an impeller 271 rotated and disposed inside the assembly groove 131 of the root waterway and a generator 272 fixed to the fixation seat, the impeller is rotated relatively to the generator under the force of the water flow. To ensure the flow force, the connection opening of the assembly groove is inclined. To ensure that the power the power generating module 270 supplied is enough for the processing unit 210, preferred, a rectifier and filter circuit 273 and a voltage reduction and stabilizing circuit 274 are connected between the output of the generator 272 and the battery module 250, the diagram is figured out in the FIG. 11. In this embodiment, it applied with the power generating module 270 and the battery module 250 as the power device 220, but not limited, other external power is available.

Figure 12:
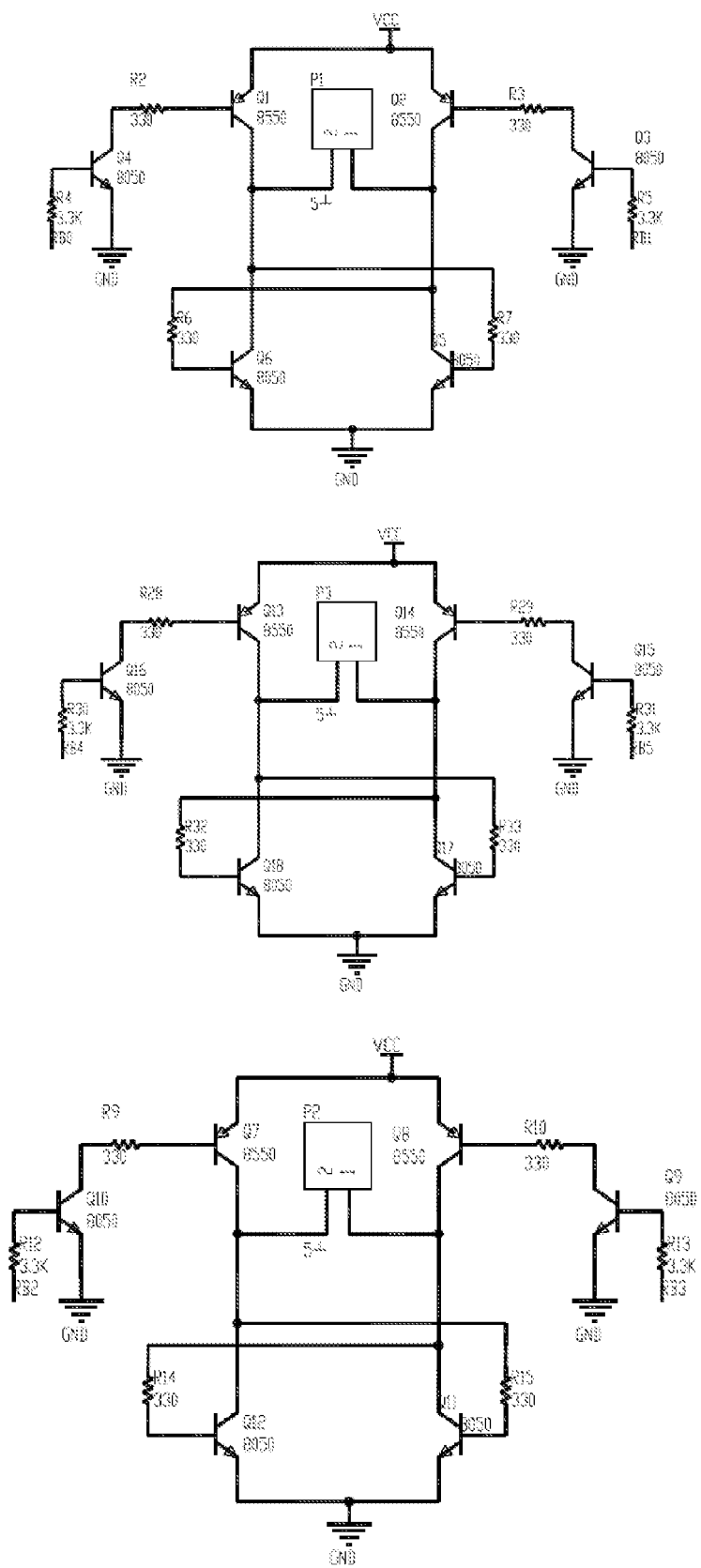
FIG. 12 illustrates the diagram of the driving circuit of the first embodiment of the present invention.

The diagram of the three driving modules 191, 192, 193 is figured out in the FIG. 12. The three driving modules 191, 192, 193 are separately connected to three signal output of the processing unit 210. The driving module is disposed at least an amplifier to amplify the signal of the signal output to a signal to control the electromagnetic valve.

Figure 13:
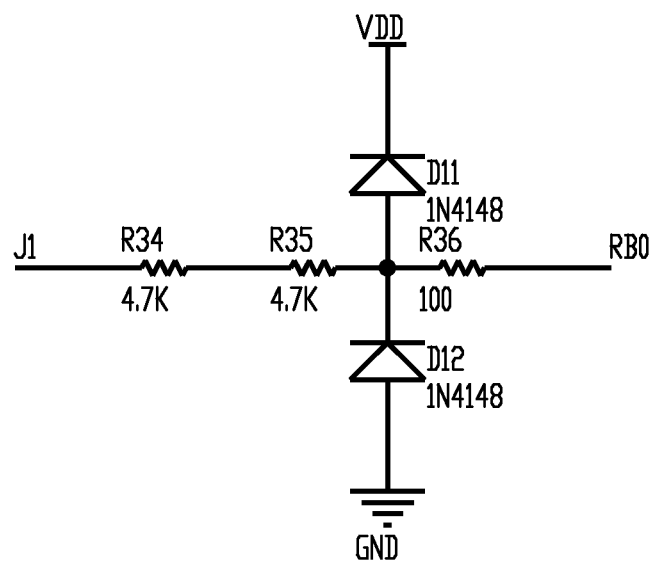
FIG. 13 illustrates the diagram of the revolution detecting module of the first embodiment of the present invention.

The revolution detecting module 230 is connected to the processing unit 210 in signal way. The diagram is figured out in FIG. 13. The revolution detecting module 230 is used to detect the water state, but not limited, other flow transducer or water pressure transducer is available in this embodiment.

Figure 14:
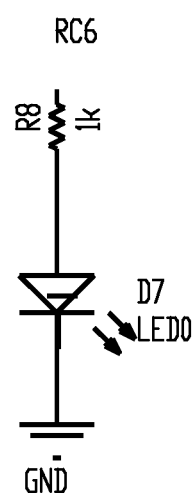
FIG. 14 illustrates the diagram of the LED indicating light of the first embodiment of the present invention.

As required, an LED indicating light 260 is further disposed to connect to the processing unit in signal way. Refer to the FIG. 14.

The Second Embodiment

Figure 15:
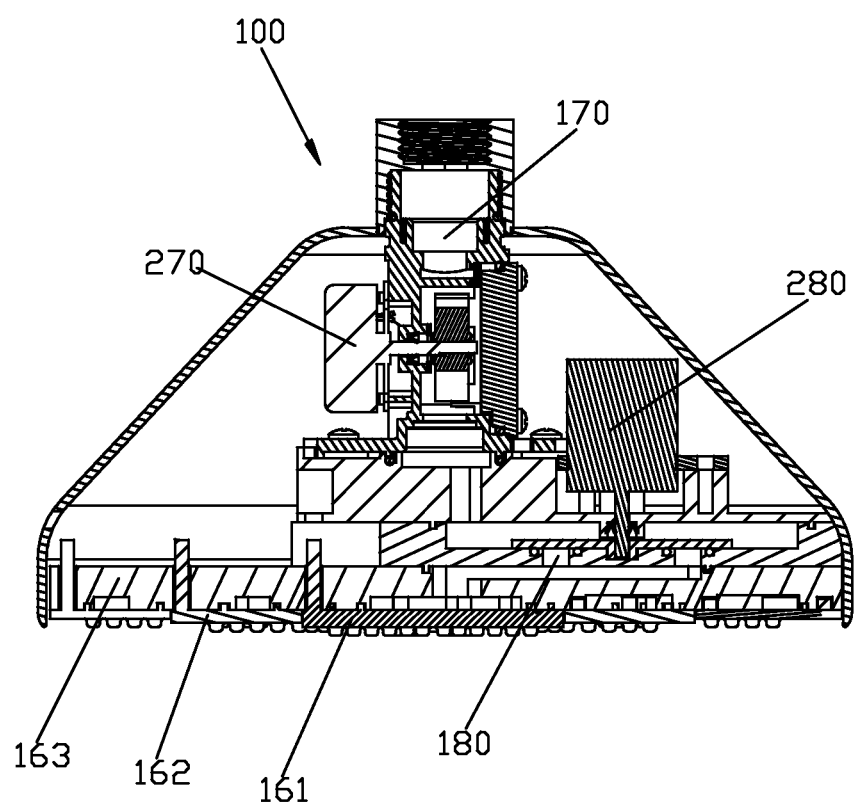
FIG. 15 illustrates the sectional view of the shower of the second embodiment of the present invention.
Figure 16:
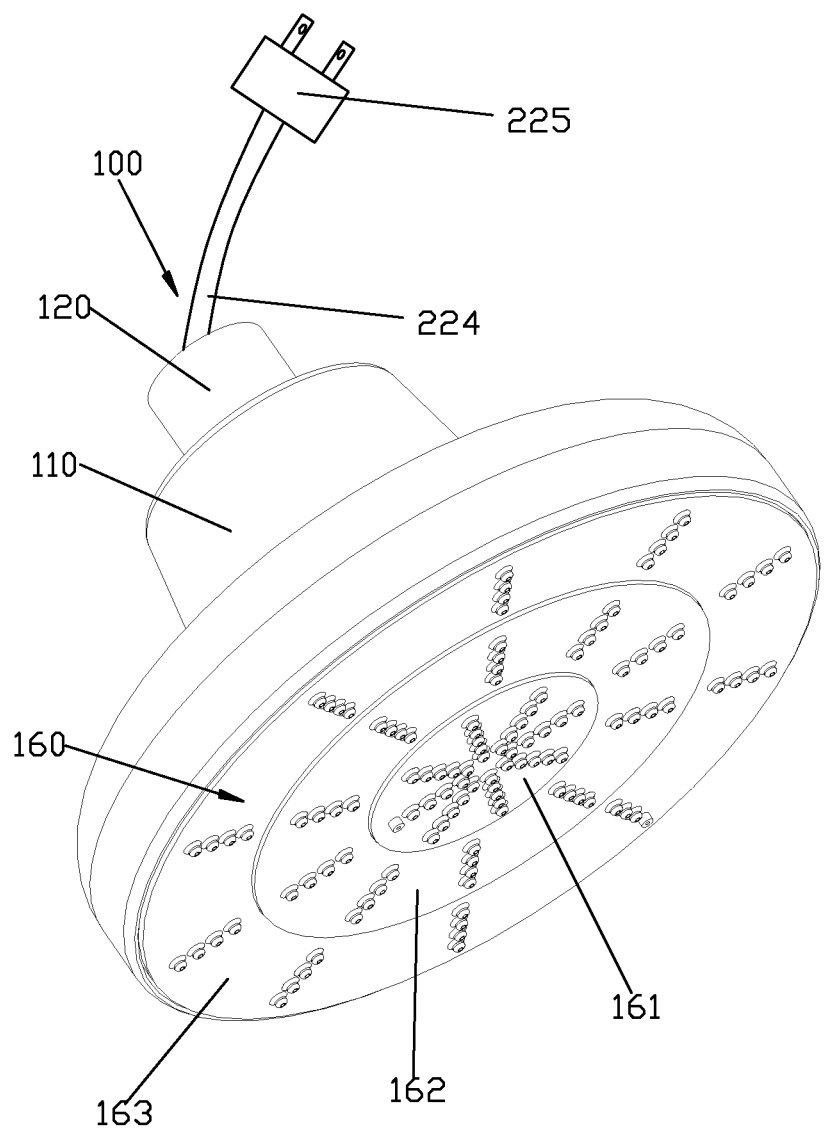
FIG. 16 illustrates the structure of the shower of the third embodiment of the present invention.

Refer to the FIG. 15, which illustrates the structure of the second embodiment, the difference from the previous embodiment is as below:

There is no electromagnetic valve in the three diversion waterways 180. A water diversion body 300 is rotated and disposed inside the shower body. The water diversion body 300 is disposed with a through hole, one end of the through hole is connected to the root waterway 170, while the other end is alternately connected to the three diversion waterways 180. When the water diversion body 300 is rotated in different angle, the three diversion waterways 180 are switched to connect to the root waterway 170.

The switch control device 200 is disposed at least a processing unit 210, three touch module 221, 222, 223, a power device 220 connected to the processing unit 210 and a motor 280. The touch layer of the three touch modules is separately disposed in the corresponding outlet cover 161, 162, 163. The processing unit 210 is connected to the touch module in signal way, the processing unit 210 is connected to the motor 280 in signal way, the motor 280 is connected to the water diversion body 300. When the touch layer of the outlet cover 161 is touched, the processing unit controls the motor to rotate in a first angle, water flows out of the first diversion waterway; when the touch layer of the outlet cover 162 is touched, the processing unit controls the motor to rotate in a second angle, water flows out of the second diversion waterway; when the touch layer of the outlet cover 163 is touched, the processing unit controls the motor to rotate in a third angle, water flows out of the third diversion waterway.

The Third Embodiment

The difference from the first embodiment is as below: the power device 220 is disposed with a lead 224 electrically connected to the processing unit and a plug 225 connected to the lead 224, the plug 225 can connect to an outer power resource.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

INDUSTRIAL APPLICABILITY

The present invention is provided with a touch switch shower, in which the touch layer of the touch modules is separately disposed in the touch area of the outlet cover unit, the touch area is large enough for the user to operate. The operation is convenient and accurate with low cost, and the size of the shower is reduced. Several touch layers are corresponding to the electromagnetic valves one by one, which is convenient to control. And the outlet type is with multi-combination. The present invention is provided with well industrial applicability.

The invention claimed is:

1. A touch switch shower, which is provided with a shower body and a switch control device;
   the shower body is provided with a root waterway, a number of diversion waterways and an outlet cover unit, and each diversion waterway is provided with an electromagnetic valve to control on-off operation thereof; wherein:
   a front side of the outlet cover unit is divided into a number of touch areas equal to a number of the electromagnetic valves;
   the switch control device is provided with at least a processing unit, a number of touch modules equal to the number of the electromagnetic valves and a power device connected to the processing unit, touch layers of the touch modules are separately disposed in the corresponding touch areas of the outlet cover unit, the processing unit is connected to the touch modules, and the processing unit is connected to the electromagnetic valves.

2. A touch switch shower according to claim 1, wherein the outlet cover unit includes a number of outlet covers equal to the number of the diversion waterways and corresponding to the diversion waterways one by one, the front sides of the outlet covers form the touch areas, and the outlet covers form distinct outlet areas.

3. A touch switch shower according to claim 2, wherein a back side of each outlet cover is convex and provided with a connection cylinder, and the connection cylinder is coated with a signal connection layer;
   the touch module further provided with a touch processing circuit, the signal connection layer connected to the touch layer and the touch processing circuit.

4. A touch switch shower according to claim 3, wherein the outlet cover unit includes three outlet covers concentrically arranged, an edge of the back side of each outlet cover is provided with a limited cylinder of which a central axis is parallel to a central axis of the concentric circle, the limited cylinder fixed to a valve seat and passes through the valve seat.

5. A touch switch shower according to claim 1, wherein the power device includes a power generating module.

6. A touch switch shower according to claim 1, wherein the power device includes a power generating module and a battery module electrically connected to the power generating module, the battery module electrically connected to the processing unit.

7. A touch switch shower according to claim 6, wherein the power module includes an impeller rotatably disposed inside the root waterway and a generator fixed to the shower body, the impeller rotating relative to the generator under the force of the flow inside the root waterway.

8. A touch switch shower according to claim 7, wherein a rectifier and filter circuit and a voltage reduction and stabilizing circuit are electrically connected between the output of the generator and the battery module.

9. A touch switch shower according to claim 1, wherein the power device is provided with a lead electrically connected to the processing unit and a plug connected to the lead, the plug being configured to connect to an outside power resource.

10. A touch switch shower according to claim 9, wherein the generator is provided with a detecting module to detect a state of the root waterway, the detecting module connected to the processing unit.

11. A touch switch shower, which includes a shower body and a switch control device;

the shower body is provided with a root waterway, a number of diversion waterways and an outlet cover unit;

a rotation water diversion body is rotatably disposed inside the shower body, the rotation water diversion body provided with a through hole, one end of the through hole connected to the root waterway, the other end of the through hole is corresponding to one of the diversion waterways; wherein:

a front end of the outlet cover unit is divided into a number of touch areas equal to a number of the diversion waterways;

the switch control device is provided with at least a processing unit, a number of touch modules equal to a number of the diversion waterways, a power device connected to the processing unit and a motor, touch layers of the touch modules are separately disposed in corresponding touch areas of the outlet cover unit, the processing unit is connected to the touch modules, the processing unit is connected to the motor, and the motor is connected to the water diversion body.

* * * * *